(12) United States Patent
Furusawa et al.

(10) Patent No.: US 6,341,799 B1
(45) Date of Patent: Jan. 29, 2002

(54) AIRBAG INFLATOR WITH EXTERNAL FILTER

(75) Inventors: Takasi Furusawa, Tokyo (JP); Josef Heinle, Ichenhausen (DE); Paresh S. Khandhadia, Troy, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/642,168

(22) Filed: Aug. 18, 2000

Related U.S. Application Data

(60) Provisional application No. 60/150,049, filed on Aug. 20, 1999.

(51) Int. Cl.$^7$ .............................................. B60R 21/26
(52) U.S. Cl. ....................................... 280/736; 280/742
(58) Field of Search .................................. 280/736, 741, 280/742

(56) References Cited

U.S. PATENT DOCUMENTS

| | | | |
|---|---|---|---|
| 5,505,488 A | 4/1996 | Allard | 280/740 |
| 5,799,973 A | 9/1998 | Bauer, et al. | 280/741 |
| 5,806,888 A | 9/1998 | Adamini | 280/741 |
| 6,186,541 B1 * | 2/2001 | Ruge et al. | 280/736 |
| 6,189,924 B1 * | 2/2001 | Hock | 280/736 |

* cited by examiner

Primary Examiner—Paul N. Dickson
(74) Attorney, Agent, or Firm—Dinnin & Dunn P.C.

(57) ABSTRACT

An airbag module (10) contains a gas generating inflator (18) containing a plurality of apertures (24) in radially spaced relation to an external annular filter (40) constrained by a retainer (42). The plurality of apertures (24) are each radially aligned with the filter (40). Gases produced from inflator (18) are thus cooled and dispersed with a minimum pressure drop, thereby providing a pressure sufficient to inflate an airbag (16).

2 Claims, 1 Drawing Sheet

AIRBAG INFLATOR WITH EXTERNAL FILTER

CROSS-REFERENCE TO RELATED APPLICATIONS

This application claims the benefit of provisional application Ser. No. 60/150,049 filed on Aug. 20, 1999.

BACKGROUND OF THE INVENTION

Installation of inflatable occupant restraint systems, generally known as "airbags", as standard equipment in all new vehicles, has intensified the search for smaller, lighter, less expensive restraint systems. Accordingly, since the inflator used in such systems is the heaviest and most expensive component of an inflatable occupant restraint system, there is a need for a lighter and less expensive inflator.

A typical inflator comprises a cylindrical steel or aluminum housing having a diameter and length related to the vehicle application and characteristics of the propellant contained therein. The inflator is generally provided with an internal filter comprising one or more layers of steel screen of varying mesh and wire diameter. Gas produced upon combustion of the propellant passes through the filter before exiting the inflator. Co-owned U.S. Pat. Nos. 5,628,528 and 5,622,380, herein incorporated by reference, exemplify inflators having internal filters.

However, known internal filters are, of necessity, relatively heavy due to their disposition in close proximity to the propellant. The high gas temperatures produced upon combustion of the propellant dictate the use of relatively heavy wire mesh to preclude burn through. In addition, since it is desirable to maximize the pressure and volume of the gas entering the airbag in relation to the size of the inflator, pressure attenuation upon passage of combustion gases through the filter must be minimized.

SUMMARY OF THE INVENTION

The solution to the problem of reducing airbag inflator size, weight, cost and efficiency, in accordance with the present invention, is predicated on the concept that it is possible to utilize a relatively small and lightweight filter if it is disposed externally of the inflator housing and properly orientated relative to the gas discharge apertures in the inflator housing. Moreover, external orientation of the filter in spaced relation to the gas discharge orifice of the inflator effects expansion and cooling of combustion gases, minimizes heating of the filter and minimizes pressure drop in the gases emanating from the inflator.

DETAILED DESCRIPTION OF THE PREFERRED EMBODIMENT(S)

Figure 1:
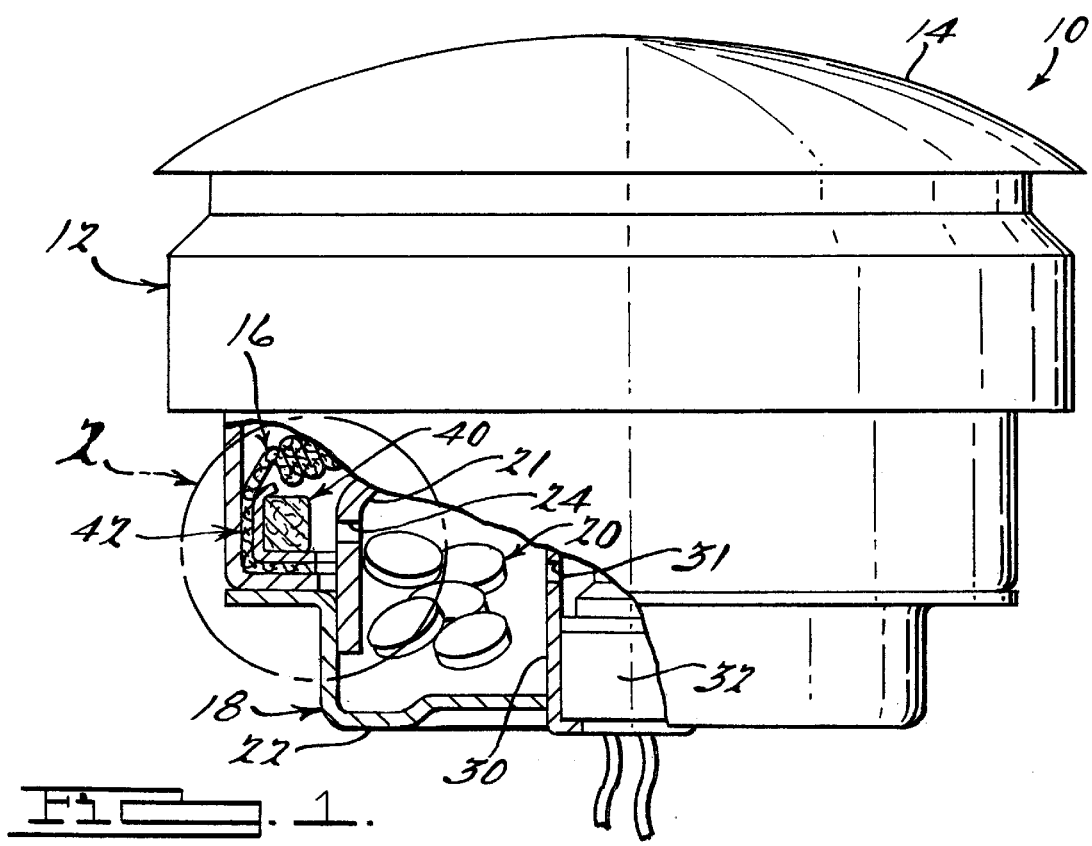
FIG. 1 is an elevational view, partially in section, of a driver side inflator.

As seen in FIG. 1 of the drawing, a driver side airbag module 10, comprises four major components, namely, a housing 12 having a rupturable frontal closure 14, an airbag 16 and an inflator 18 having a propellant 20 therein. The inflator 18 comprises upper and lower cup-shaped sections 21 and 22, respectively, that are welded together in inverted nested relationship. The upper housing section 21 of the inflator 18 contains a plurality of apertures 24 for effecting radial discharge of gas produced by the propellant 20. The inflator 18 has a perforated and centrally disposed igniter support tube 30 welded therein for the support of an igniter 32. The perforated tube allows a frame front generated by the igniter 32 to pass to the propellant 20, thereby igniting propellant 20 and producing an inflating gas. The propellant 20 may be any known gas generant composition useful for airbag application and is exemplified by, but not limited to, compositions described in U.S. Pat. No. 5,035,757 herein incorporated by reference.

In accordance with the present invention, at least one annular filter 40 is disposed externally of the inflator 18. The filter 40 comprises a fine wire mesh annulus that is retained by a combination filter retainer, airbag anchor, and combustion gas deflector 42. A lower end portion 44 of the airbag 16 is folded radially inwardly under a radial flange 46 on the filter retainer 42. A radially inwardly extending flange 48 on the filter retainer 42 secures the filter 40 in radially spaced relation to the upper wall section 21 of the inflator 18. The filter 40 is readily obtainable by sources well known in the art.

In accordance with one feature of the invention, the gas discharge apertures 24 in the upper section 21 of the inflator 18 are radially aligned with the filter 40. The high-velocity gas exiting the inflator 18 is volumetrically expanded and cooled in an annular space 50 between the upper wall section 21 of the inflator 18 and the filter 40, prior to entering the filter 40. Thus, given a reduction in velocity, the filter 40 can be fabricated from relatively fine, lightweight wire minimizing weight and maximizing its capability to filter fine particulates from the gas stream.

In one embodiment, for example, lightweight wire is exemplified but not limited to strands measuring from five to ten thousandths of an inch ($5/1000$ to $10/1000$ inches) in diameter, or less. The lightweight wire is then meshed together by methods well known in the art. Stated another way, lightweight wire filters are simply filters containing wires having a smaller diameter than those normally used in internal filters. Mesh filters are readily obtainable from companies such as Wayne Wire Cloth of Hillman, Mich. The filters can also be formed, for example, from sintered steel wool, or from loose metal fibers heated just below their melting point and then held at that temperature until the loose fibers are fused together.

Figure 2:
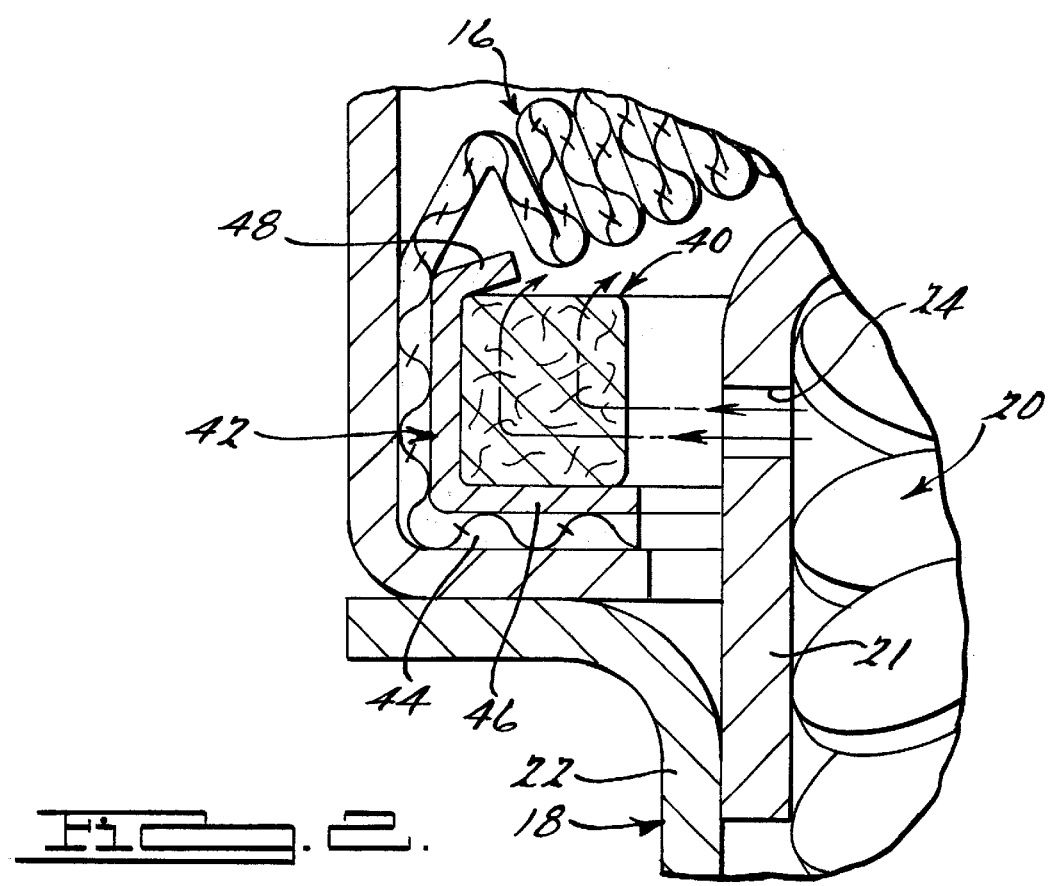
FIG. 2 is an enlarged view taken with the circle 2 of FIG. 1.

As illustrated by the arrows in FIG. 2, the flange 48 on the filter retainer 42 redirects radial flow of the gas from the inflator 18 to axial flow into the airbag 16.

In operation, gases generated by the propellant 20 exit apertures 24 and are cooled as they traverse annular space 50 and then radially impinge upon external filter 40. As the gases migrate through the filter, the retainer 42 routes the inflating gases into the airbag 16. In contrast to state-of-the-art inflators having an internal filter, the pressure drop of the gas leaving the filter is minimized while yet providing adequate filtration and cooling of the gas.

It will be understood that the foregoing description of the preferred embodiment of the present invention is for illustrative purposes only. As such, the various structural and operational features herein disclosed are susceptible to a number of modifications, none of which departs from the scope of the present invention as defined in the appended claims.

We claim:

1. An airbag module comprising:
   an inflator comprising a housing wherein said housing contains an upper section and a lower section but not a filter;

a gas generating propellant contained within said housing;

a plurality of apertures spaced about the periphery of said upper section;

at least one annular filter in external and radially spaced relation to said housing thereby forming an annular space between said filter and said plurality of apertures, wherein said plurality of apertures are radially aligned with said filter;

a filter retainer having a portion radially external of said filter for securing said filter;

an airbag arranged to fluidly communicate with said plurality of apertures; and a radially inwardly extending flange integral to said filter retainer for directing a gas flow produced from said propellant to inflate an airbag.

2. An airbag inflator comprising:

a housing containing an upper section and a lower section but not a filter;

a gas generating propellant contained within said housing;

an igniter within said housing for igniting said propellant;

a plurality of apertures spaced about the periphery of said upper section;

at least one annular filter in external and radially spaced relation to said housing thereby forming an annular space between said filter and said plurality of apertures, wherein said plurality of apertures are radially aligned with said filter;

a filter retainer having a portion radially external of said filter for securing said filter; and a radially inwardly extending flange integral to said filter retainer for directing gas flow produced from said propellant.

* * * * *